UNITED STATES PATENT OFFICE.

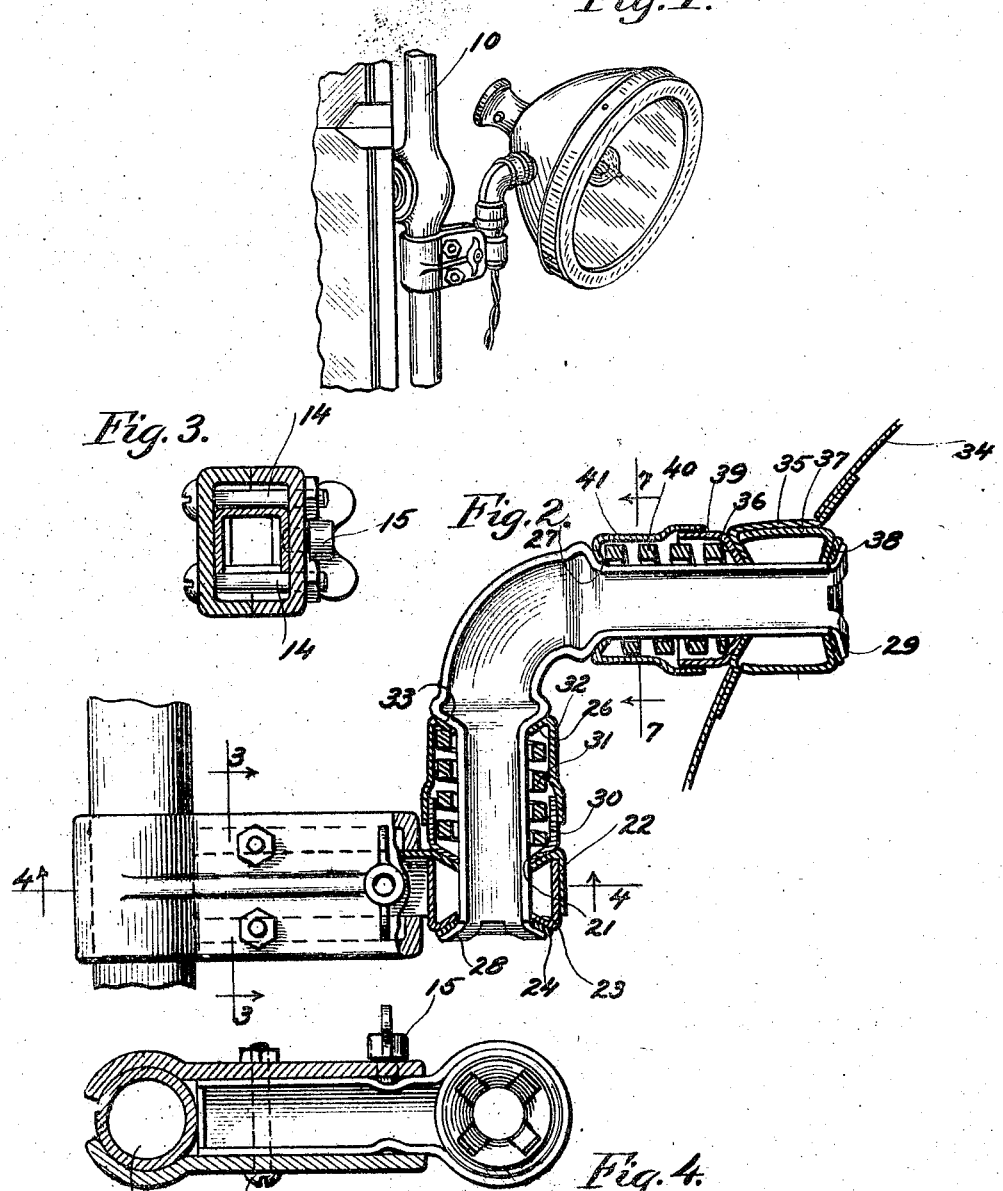

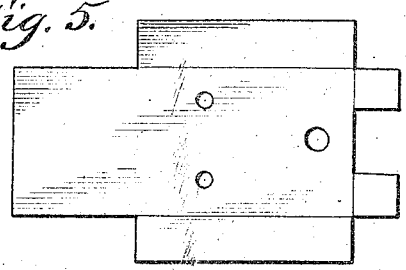
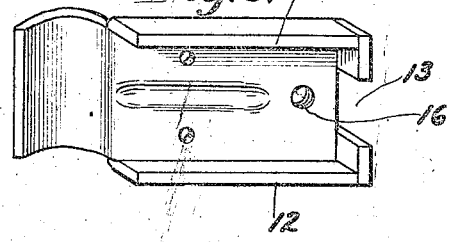
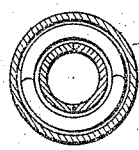
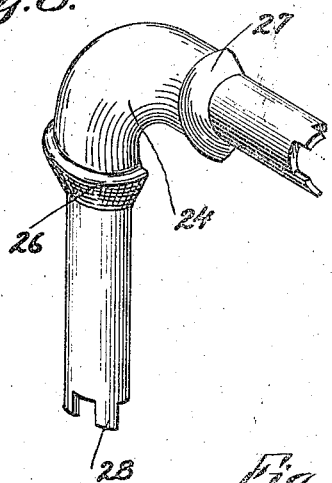
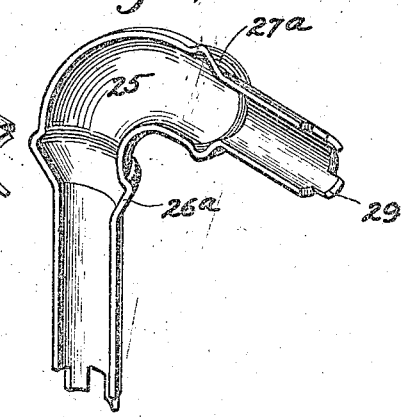
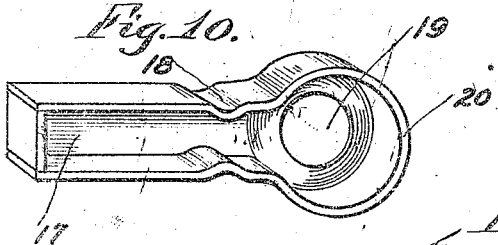

EDWARD F. BESSEY AND WILLIAM H. BEIERS, OF CHICAGO, ILLINOIS, ASSIGNORS TO HOWE MANUFACTURING COMPANY, OF CHICAGO, ILLINOIS, A CORPORATION.

LAMP-BRACKET.

1,299,899.  Specification of Letters Patent.  Patented Apr. 8, 1919.

Application filed March 8, 1917. Serial No. 153,382.

*To all whom it may concern:*

Be it known that we, EDWARD F. BESSEY and WILLIAM H. BEIERS, citizens of the United States, and residents of Chicago, in the county of Cook and State of Illinois, have invented certain new and useful Improvements in Lamp-Brackets, of which the following is a specification.

Our invention relates to lighting devices and has particular reference to a novel bracket for use in attaching a searchlight to an automobile.

It is now becoming common practice to mount a searchlight or so-called spotlight on the windshield of an automobile, provision being made for movement on a vertical and a horizontal axis. Due to the continuous vibration and the exposure to the weather, much difficulty has been experienced in maintaining flexibility in the joints without a constant uncertainty as to the integrity of the structure. This has arisen because of the necessity for employing threaded connections and nuts to hold the parts together. The loosening of an adjusting nut not infrequently destroys the usefulness of the device. If the adjusting nut be set too tight the required movements of the lamp are made with difficulty.

We propose to construct a unitary lamp structure, consisting of the lamp casing, the arm adapted for removable connection to a support and a tube for uniting the lamp and arm, the ends of the tube being upset or crimped into holding engagement with the coöperating parts. Mounted on the tube are suitable spring pressed bearing members, acting to frictionally hold the parts in adjusted positions.

In this structure there are no nuts to become loose and no threaded connections of any sort. The parts are so designed as to enable all thereof to be produced by stamping and pressing thereby materially lessening the cost thereof. The spring compression will be exactly the same in each device and the frictional resistance to adjustment will be constant thereafter. The springs are inclosed and the joints so arranged as to prevent trapping of moisture and consequent deterioration. The joints are sufficiently exposed to enable the application of a few drops of lubricant occasionally.

In this manner we provide a device which is impregnable to vibration and the loss of attaching or adjusting parts; which may be handled, sold and applied as a unit and without the necessity for adjustments; which may be detached as a whole and used for other purposes without danger of loss of any parts, and which may be produced in quantities very cheaply.

The invention will be more readily understood by reference to the accompanying drawing in which, Figure 1 is a perspective view of a lamp and bracket in its operative position upon an automobile;

Fig. 2 is an enlarged sectional elevation of the bracket;

Fig. 3 is a sectional view on the line 3—3 of Fig. 2;

Fig. 4 is a sectional view on the line 4—4 of Fig. 2;

Fig. 5 is a plan view of the blank used in forming one of the halves of the attaching bracket;

Fig. 6 shows the half of the bracket in its completed state;

Fig. 7 is a sectional view on the line 7—7 of Fig. 2;

Figs. 8 and 9 are perspective views of the two halves of the tubular post, and,

Fig. 10 is a perspective view of the lateral arm which engages the clamp, one-half of which is shown in Fig. 6.

The invention is shown in Fig. 1 as applied to a windshield frame, 10, the clamping member consisting of duplicate halves, one of which is shown in Figs. 5 and 6. Each of these brackets or clamp members is formed from a single sheet of metal, shaped as shown in Fig. 5. Following the formation of the blank in that shape, it is pressed or stamped to bend the side edges at right angles, thereby forming the lateral flanges, 11—12. The tongues at the end of the blank are likewise bent at right-angles to the body of the member, the members when so bent serving to outline an opening, 13, within which the lamp arm, shown in Fig. 10, is accommodated. The tongue or projection upon the operative end of the blank is curved, or otherwise suitably shaped to accommodate it to the windshield frame to be engaged thereby. Two halves, formed as described, are united by means of transverse bolts, 14, the space between the two bolts being substantially exactly equal to the vertical thickness of the arm, shown in Fig. 10, which supports the lamp. This is best illustrated in Fig. 3. As a means for removably retaining the arm in position, we provide the thumb screw, 15, which occupies the threaded aperture, 16, in the clamping member, shown in Fig. 6.

The supporting arm best shown in Fig. 10 is likewise stamped from a single sheet of metal thereby providing the rectangular portion, 17, which interfits with the clamping members, as just described, and in the side edges of which suitable depressions or grooves, 18, are provided. These register with the thumb screw, 15, as best shown in Fig. 4. The opposite end of the arm is in the form of a cup, having an axial opening, 19, and side walls, 20. The metal surrounding the opening, 19, and constituting the bottom wall of the cup is deflected axially to form a cone seat, 21, best shown in Fig. 2. Fitted within the cup is a ferrule, 22, best shown in Fig. 2, which is likewise provided with an axial opening surrounded by a dished wall, 23, thereby forming a conical seat. A washer, 24, directly contacts this seat, the washer serving as the support for the upset ends of the tubular lamp standard about to be described.

The tubular standard or bracket is best shown in Figs. 8 and 9 and comprises two duplicate stampings, 24—25, forming, when assembled, a tubular right-angle elbow. Each of the halves is provided with portions, 26—26ª—27—27ª, in the form of bearings, which are integrally stamped out during the process of forming the members. The ends of the members are notched to provide tongues, 28—29, adapted to be upset or crimped when the parts are suitably assembled.

The two halves of the standard are not united by soldering or welding, but are held in the proper relation by reason of the conical character of the bearings on the surrounding ferrules. These under the action of the springs tend to rigidly clamp and hold the two halves in proper relation without additional means. As shown in Fig. 2 a ferrule, 30, surrounds the assembled halves of the standard and is provided with a convex bearing adapted for coöperation with the concave seat, 21, on the arm, shown in Fig. 10. The ferrule, 30, receives a strong coil spring, 31, the upper end of which is accommodated within a ferrule, 32, the lower end of which is telescoped over the ferrule, 30. The upper end of the part, 32, is provided with a concave seat, 33, for engagement with the integral cone bearing, 26—26ª, on the standard.

The upper end construction is very similar to that just described. Connected to the lamp casing, 34, is a pressed bearing member, 35, having a concave seat, 36. A ferrule or short tube, 37, is telescoped into this member from the inside, the ferrule providing a concave seat for the accommodation of a washer, 38, against which the notched ends, 29, of the standard are forced. A ferrule, 39, having a convex seat engages the concave seat, 36, of the member, 35, and acts to receive a spring, 40. The spring bears upon a tubular member, 41, which telescopes over the tubular member, 39, and is provided with a seat which is engaged by the integral bearing, 27, 27ª, on the standard.

The parts are assembled as follows: The two halves, 25—26, of the standard are united loosely and the tubular member, 32, slipped thereon—this is followed by the spring, 31, and the ferrule, 30. The lateral arm is next fitted into place together with the ferrule, 22, and the washer, 24. Force is applied to slightly compress the spring, 31, after which the ends, 28, of the standard are upset or crimped into the position of Fig. 2. The same steps are followed for the opposite end of the structure. It will be noted when thus assembled, the lamp casing standard and supporting arm are in the form of a unit, having rotative movement on two axes relative to the supporting arm and which cannot be disturbed except by physically distorting the metal. It will be noted that all of the parts are formed of stampings and may, therefore, be constructed very cheaply. There are no parts to become loose or out of adjustment. The clamp may be rigidly secured to the windshield and the lamp casing removed and replaced, as desired, by manipulating the thumb screw, 15.

Obviously the exact form and arrangement of the parts is not essential, and we do not wish to be limited to the exact form herein shown and described.

We claim:

1. A lamp bracket in combination, a plurality of duplicate stampings, means for clamping the same in operative relation to form a tube, means for clamping said tube in operative relation to a support, and means for clamping said tube in operative engagement with a lamp.

2. A lamp bracket including in combination a pair of duplicate stampings shaped to form a tube when associated, and means for rigidly retaining the halves in position without physically uniting them, said means including a plurality of independently movable ferrules, substantially as described.

3. A lamp bracket including in combination a pair of duplicate, semi-tubular sections, each section being formed with a diametric enlargement and a ferrule coöperating to retain the sections in operative relation, said ferrule having a bearing on said enlargements, substantially as described.

4. In a device of the class described the combination of a post bent to substantially a right angle and divided on a longitudinal line to form a plurality of equal parts, an annular protuberance on the post, and a ferrule fitting said post, and having a portion bearing on said protuberance, said ferrule acting to retain the parts of the post in operative position, substantially as described.

5. In a lamp bracket, the combination of an angular lamp standard having an integral annular seat, a spring cup fitting said standard and contacting said seat, a spring engaging said cup, and a lamp casing engaging said standard and acting to compress said spring, the extremity of said standard being upset or crimped in order to retain the parts in position, substantially as described.

6. In combination, a lamp, an arm adapted to be fixed to a support, and a tubular pressed metal post connecting the arm and lamp, the ends of the post being crimped into engagement with the arm and lamp, substantially as described.

7. In combination a lamp, an arm adapted to be fixed to a support, a tubular pressed metal standard, the extremities of which are crimped into engagement with the lamp and arm, and spring means on the standard for frictionally holding the lamp in adjusted position, substantially as described.

8. In combination a lamp, an arm adapted to be fixed to a support, a tubular pressed metal standard, the extremities of which are crimped into engagement with the lamp and arm, and spring means on the standard for frictionally holding the lamp in adjusted position, said spring having a fixed compression, substantially as described.

9. In combination, a lamp, an arm adapted to be fixed to a support, and a tubular post connecting the lamp and arm, the ends of the post being upset to relatively permanently unite it to the arm and lamp, said post being divided on a longitudinal line to form a plurality of duplicate parts, substantially as described.

10. A unitary lighting structure including in combination a lamp, an arm adapted to be engaged by a clamp, a post connecting the arm and lamp, spring means on said post adapted to hold the lamp in frictionally adjusted position on the post and other spring means adapted to hold the post in frictionally adjusted position with the clamp, the spring means being held in operative position by upsetting the metal of the post.

11. A unitary searchlight structure including in combination a lamp casing, an arm shaped for removable engagement with a support, a tube connecting the lamp and arm, a spring providing for relative rotation between the lamp and tube against frictional resistance, the parts being relatively permanently united in operative relation by crimping the ends of the tube, substantially as described.

12. An automobile lamp and a bracket on which the same is mounted for adjustment on two axes, the device being in the form of a unitary structure in which the parts are permanently united against separation including in combination a lamp casing, an L-shaped tube providing friction bearings, an arm, said casing being rotatable on two axes against the friction of the bearings for the lamp and arm on the tube, the ends of the tube being upset to hold the parts in operative relation, substantially as described.

13. In a lighting structure the combination of a casing, a supporting arm, a tubular post connecting the same, said post being composed of two duplicate stampings, and having peripheral enlargements acting as cone bearing seats, said casing and arm having similar seats and springs interposed between the seats, all the parts being retained by upsetting the ends of the post, substantially as described.

14. In a lighting structure the combination of a casing, a supporting arm, a tubular post connecting the same, said post being composed of two duplicate stampings, and having peripheral enlargements acting as cone bearing seats, said casing and arm having similar seats, telescoping ferrules the ends of which bear against said seats, and springs confined within the ferrules, the ends of the post being upset to confine all the parts in operative relation, the ferrules having the triple functions of retaining the halves of the post in alinement, acting as friction bearings and as a housing for the springs, substantially as described.

15. In a lamp mounting the combination of a casing, an arm adapted to be removably mounted on a support, a continuous tube extending between and rotatably secured to the casing and arm, integral bearings on said tube, and spring means engaging said bearings and frictionally holding the arm and casing in adjusted positions with relation to said tube, substantially as described.

16. In a lamp mounting the combination of a casing, an arm adapted to be removably mounted on a support, a continuous tube extending between and rotatably secured to the casing and arm, the ends of said tube being crimped into holding engagement with said arm and said casing, and integral bearings adapted for frictionally holding the parts in adjusted position, substantially as described.

Signed at Chicago, Illinois, this fifth day of March, 1917.

EDWARD F. BESSEY.
WM. H. BEIERS.

Witnesses:
BERT G. COCHRANE,
MILTON T. MILLER.